United States Patent
Jones et al.

(10) Patent No.: US 12,516,811 B2
(45) Date of Patent: Jan. 6, 2026

(54) INLET ASSEMBLY FOR AN ABATEMENT ASSEMBLY AND METHOD OF CONVEYING AN EFFLUENT TO AN ABATEMENT CHAMBER

(71) Applicant: Edwards Limited, Burgess Hill (GB)

(72) Inventors: Gemma Haf Jones, Burgess Hill (GB); Alageswaren Reddi Balsamy Radiar, Burgess Hill (GB); Neil Andrew Maddock, Burgess Hill (GB); Gareth David Stanton, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 431 days.

(21) Appl. No.: 18/000,598

(22) PCT Filed: May 24, 2021

(86) PCT No.: PCT/GB2021/051257
§ 371 (c)(1),
(2) Date: Dec. 2, 2022

(87) PCT Pub. No.: WO2021/245371
PCT Pub. Date: Dec. 9, 2021

(65) Prior Publication Data
US 2023/0213186 A1    Jul. 6, 2023

(30) Foreign Application Priority Data

Jun. 5, 2020 (GB) .................................. 2008503

(51) Int. Cl.
*F23D 14/02* (2006.01)
*F23D 14/62* (2006.01)
*F23G 7/06* (2006.01)

(52) U.S. Cl.
CPC .............. *F23G 7/065* (2013.01); *F23D 14/02* (2013.01); *F23D 14/62* (2013.01); *F23D 2900/14701* (2013.01); *F23G 2209/142* (2013.01)

(58) Field of Classification Search
CPC ...................... F23D 14/02; F23D 14/62; F23D 2900/14701; F23G 2209/142; F23G 7/065
(Continued)

(56) References Cited

U.S. PATENT DOCUMENTS 2,753,925 A * 7/1956 Campbell ............... F23G 7/065
122/7 D
3,993,449 A * 11/1976 Childs ....................... F23G 5/14
431/9

(Continued)

FOREIGN PATENT DOCUMENTS

| CN | 102047041 A | 5/2011 |
| CN | 107850299 A | 3/2015 |

(Continued)

OTHER PUBLICATIONS

British Examination Report dated Nov. 13, 2020 and Search Report dated Nov. 11, 2020 for corresponding British Application No. GB2008503.1, 6 pages.

(Continued)

*Primary Examiner* — Avinash A Savani
(74) *Attorney, Agent, or Firm* — Theodore M. Magee; Westman, Champlin & Koehler, P.A.

(57) ABSTRACT

An inlet assembly for an abatement apparatus includes: an effluent stream conduit configured to convey an effluent stream along a major direction of flow within the effluent stream conduit; an inlet nozzle fluidly coupled with the effluent stream conduit and configured to convey the effluent stream received from the effluent stream conduit to an (Continued)

abatement chamber of the abatement apparatus; and a baffle interposed between the effluent stream conduit and the inlet nozzle, the baffle being shaped and configured to redirect flow of the effluent stream from the effluent stream conduit into the inlet nozzle by inhibiting effluent stream flow along the major direction of flow into the inlet nozzle. A line-of-sight flow from the effluent stream conduit into the inlet nozzle is prevented by the baffle and the effluent stream instead follows a non-line-of-sight or diversionary path from the effluent stream conduit into the inlet nozzle, which improves DRE.

19 Claims, 10 Drawing Sheets

(58) Field of Classification Search
 USPC .............................................................. 431/5
 See application file for complete search history.

(56) References Cited

U.S. PATENT DOCUMENTS

| | | | | |
|---|---|---|---|---|
| 4,054,418 | A | | 10/1977 | Miller et al. |
| 4,154,567 | A | * | 5/1979 | Dahmen ................. F23G 7/065 431/9 |
| 4,392,817 | A | | 7/1983 | Berlie et al. |
| 4,752,213 | A | * | 6/1988 | Grochowski ........... F23D 14/02 431/351 |
| 5,284,102 | A | | 2/1994 | Thomason |
| 5,562,438 | A | * | 10/1996 | Gordon ................... F23D 14/24 431/9 |
| 5,580,238 | A | | 12/1996 | Charles, Sr. et al. |
| 2003/0037714 | A1 | | 2/2003 | Tetsumoto et al. |
| 2006/0040223 | A1 | | 2/2006 | Ghani et al. |
| 2009/0288583 | A1 | * | 11/2009 | Song ....................... F23G 7/065 110/212 |
| 2010/0291492 | A1 | * | 11/2010 | Poe .......................... F23G 7/085 431/5 |
| 2018/0363686 | A1 | | 12/2018 | Mathis et al. |

FOREIGN PATENT DOCUMENTS

| | | |
|---|---|---|
| CN | 105135430 A | 12/2015 |
| CN | 110513705 A | 11/2019 |
| JP | H09269114 A | 10/1997 |
| JP | H10311522 A | 11/1998 |
| JP | H11509305 A | 8/1999 |

OTHER PUBLICATIONS

PCT Notification of Transmittal of the International Search Report and the Written Opinion of the International Searching Authority, or the Declaration, PCT Search Report and Written Opinion dated Aug. 16, 2021 for corresponding PCT application Serial No. PCT/GB2021/051257, 12 pages.

Taiwanese Office Action (no translation) dated Jan. 21, 2025 and Search Report dated Jan. 17, 2025 for corresponding Taiwanese application Serial No. 110120360, 9 pages.

Chinese Office Action dated Mar. 27, 2025 and Search Report dated Mar. 19, 2025 for corresponding Chinese application Serial No. 202180040512.9, 14 pages.

Japanese Notification of Reason for Rejection dated Apr. 28, 2025 for corresponding Japanese application Serial No. 2022-574552, 8 pages.

* cited by examiner

INLET ASSEMBLY FOR AN ABATEMENT ASSEMBLY AND METHOD OF CONVEYING AN EFFLUENT TO AN ABATEMENT CHAMBER

CROSS-REFERENCE OF RELATED APPLICATION

This application is a Section 371 National Stage Application of International Application No. PCT/GB2021/051257, filed May 24, 2021, and published as WO 2021/245371A1 on Dec. 9, 2021, the content of which is hereby incorporated by reference in its entirety and which claims priority of British Application No. 2008503.1, filed Jun. 5, 2020.

FIELD

The field of the invention relates to inlet assembly for an abatement apparatus.

BACKGROUND

Abatement apparatus are known and are typically used for treating an effluent gas stream from a manufacturing process tool used in, for example, the semiconductor or flat panel display manufacturing industry. During such manufacturing, residual perfluorinated compounds (PFCs) and other compounds exist in the effluent gas stream pumped from the process tool. PFCs are difficult to remove from the effluent gas and their release into the environment is undesirable because they are known to have relatively high greenhouse activity.

Known abatement apparatus use combustion to remove the PFCs and other compounds from the effluent gas stream. Typically, the effluent gas stream is a nitrogen stream containing PFCs and other compounds. A fuel gas is mixed with the effluent gas stream and that gas stream mixture is conveyed using an inlet assembly into an abatement chamber such as a combustion chamber that is laterally surrounded by the exit surface of a foraminous gas burner. Fuel gas and air are simultaneously supplied to the foraminous burner to affect flameless combustion at the exit surface, with the amount of air passing through the foraminous burner being sufficient to consume not only the fuel gas supplied to the burner, but also all the combustibles in the gas stream mixture injected into the combustion chamber.

Although techniques exist for processing the effluent gas stream, they each have their own shortcomings. Accordingly, it is desired to provide an improved technique for processing an effluent gas stream.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect, there is provided an inlet assembly for an abatement apparatus, comprising: an effluent stream conduit configured to convey an effluent stream along a major direction of flow within the effluent stream conduit; an inlet nozzle fluidly coupled with the effluent stream conduit and configured to convey the effluent stream received from the effluent stream conduit to an abatement chamber of the abatement apparatus; and a baffle interposed between the effluent stream conduit and the inlet nozzle, the baffle being shaped and configured to redirect flow of the effluent stream from the effluent stream conduit into the inlet nozzle by inhibiting effluent stream flow along the major direction of flow into the inlet nozzle.

The first aspect recognizes that a problem with existing inlet assemblies is that their performance may be below that which is possible. In particular, the destruction rate efficiency (DRE) using those inlet assemblies may not achieve the required levels. This may be due to the effluent stream transiting too rapidly through the inlet assembly and into the abatement chamber. Accordingly, an inlet assembly is provided. The inlet assembly may be an abatement apparatus inlet assembly. The inlet assembly may comprise an effluent stream conduit which conveys or provides an effluent stream. The effluent stream may travel or move generally along a direction of flow within the effluent stream conduit. The inlet assembly may comprise an inlet nozzle. The inlet nozzle may couple with the effluent stream conduit. The inlet nozzle may convey or transfer the effluent stream which is received from the effluent stream conduit into an abatement chamber. The inlet assembly may comprise a baffle. The baffle may be interposed, located or positioned between the effluent stream conduit and the inlet nozzle. The baffle may be shaped, configured, arranged or positioned to redirect or divert the flow of the effluent stream travelling from the effluent stream conduit and into the inlet nozzle. The flow may be diverted by inhibiting, blocking or preventing the effluent stream from flowing along its major direction of flow into the inlet nozzle. In this way, a line-of-sight flow from the effluent stream conduit into the inlet nozzle is prevented by the baffle and the effluent stream instead follows a non-line-of-sight or diversionary path from the effluent stream conduit into the inlet nozzle, which increases dwell time within the inlet nozzle and helps provide for more laminar flow into the abatement chamber, which improves DRE and can decrease fuel consumption.

The effluent stream may exit the effluent stream conduit along the major direction of flow.

The baffle may be shaped and configured to redirect flow of the effluent stream away from the major direction of flow into the inlet nozzle.

The baffle may be shaped and configured to encourage turbulent flow of the effluent stream upstream of the inlet nozzle. Encouraging turbulent flow can improve the mixing of the effluent stream which improves DRE.

The baffle may be shaped and configured to encourage laminar flow of the effluent stream into the inlet nozzle. Accordingly, the baffle may help to restore laminar or uniform flow of the effluent stream as it flows into the nozzle which again improves DRE.

The baffle may be shaped and configured to encourage a uniform axial rate of flow within the inlet nozzle. By providing a uniform axial flow rate within the baffle, laminar or uniform flow of the effluent stream is improved which again improves DRE.

The baffle may be shaped and configured to inhibit increased axial rate of flow within the inlet nozzle proximate the effluent stream conduit and inhibit decreased axial rate of flow within the inlet nozzle distal the effluent stream conduit to obtain the uniform axial rate of flow within the inlet nozzle. Accordingly, the baffle may reduce the axial rate of flow in areas nearest the effluent stream conduit and increase axial flow rate within areas furthest from the effluent stream conduit in order to achieve a more uniform flow rate within the nozzle to help balance flow to improve DRE.

The baffle may comprise a baffle conduit positioned within a plenum configured to receive the effluent stream from the effluent stream conduit, the baffle conduit defining at least one aperture positioned for fluid communication between the plenum and the inlet nozzle.

The baffle conduit may extend along an axial direction, coaxially aligned with the inlet nozzle.

The at least one aperture may be located away from a position on the baffle conduit which is aligned with incident effluent stream travelling along the major direction of flow. Accordingly, the apertures may be offset, positioned away, non-incident or unaligned with the major direction of flow of the effluent stream in order to reduce line-of-sight flow from the baffle conduit into the inlet nozzle to improve DRE.

The at least one aperture may be located towards at least one axial end of the baffle conduit.

The inlet assembly may comprise a plurality of the apertures.

At least some of the plurality of apertures may be located circumferentially around the baffle conduit.

A cross-sectional area of an aperture proximate to the effluent stream conduit may be smaller than a cross-sectional area of an aperture distal from the effluent stream conduit. This helps to reduce the flow rate closest to the effluent stream conduit and encourage the flow rate at a location further from the effluent stream conduit in order to balance the flow within the baffle and improving uniform flow within the inlet nozzle and improving DRE.

A cross-sectional area of the plurality of apertures may match a cross-sectional area of the baffle conduit.

The baffle conduit may be shaped to redirect flow of the effluent stream in the plenum to a direction transverse to the major direction of flow.

The apertures may be shaped to redirect flow of the effluent stream to convey the effluent stream radially into the baffle conduit.

The baffle conduit may be shaped to redirect flow of the effluent stream to convey the effluent stream in an axial direction along the baffle conduit into the inlet nozzle.

The effluent stream conduit may be shaped and configured to deliver the effluent stream along the major direction of flow which is transverse to the axial direction.

The effluent stream conduit may follow a curved path.

The baffle conduit and/or the inlet nozzle may comprise a helical structure configured to impart a circumferential rotational component to the effluent stream.

The baffle conduit and/or the inlet nozzle may comprise a coaxial lance positioned therewithin.

The helical structure may be configured to extend along the axial direction beyond the lance.

The lance may fail to extend along the axial direction beyond an opening of the inlet nozzle locatable within the abatement chamber.

The baffle conduit may extend along the axial direction for at least 5 times its internal diameter. This helps to provide sufficient distance to restore laminar flow.

According to a second aspect, there is provided an abatement apparatus comprising the inlet assembly of the first aspect and the abatement chamber.

According to a third aspect, there is provided a method, comprising: conveying an effluent stream along a major direction of flow within an effluent stream conduit; coupling an inlet nozzle with the effluent stream conduit to convey the effluent stream received from the effluent stream conduit to an abatement chamber of the abatement apparatus; and interposing a baffle between the effluent stream conduit and the inlet nozzle to redirect flow of the effluent stream from the effluent stream conduit into the inlet nozzle by inhibiting effluent stream flow along the major direction of flow into the inlet nozzle.

The effluent stream may exit the effluent stream conduit along the major direction of flow.

The method may comprise redirecting flow of the effluent stream away from the major direction of flow into the inlet nozzle.

The method may comprise encouraging turbulent flow of the effluent stream upstream of the inlet nozzle.

The method may comprise encouraging laminar flow of the effluent stream into the inlet nozzle.

The method may comprise encouraging a uniform axial rate of flow within the inlet nozzle.

The method may comprise inhibiting increased axial rate of flow within the inlet nozzle proximate the effluent stream conduit and inhibiting decreased axial rate of flow within the inlet nozzle distal the effluent stream conduit to obtain the uniform axial rate of flow within the inlet nozzle.

The method may comprise positioning a baffle conduit of the baffle within a plenum configured to receive the effluent stream from the effluent stream conduit, the baffle conduit defining at least one aperture positioned for fluid communication between the plenum and the inlet nozzle.

The baffle conduit may extend along an axial direction, coaxially aligned with the inlet nozzle.

The method may comprise locating the at least one aperture away from a position on the baffle conduit which is aligned with incident effluent stream travelling along the major direction of flow.

The method may comprise locating the at least one aperture towards at least one axial end of the baffle conduit.

There may be provided a plurality of the apertures.

The method may comprise locating at least some of the plurality of apertures circumferentially around the baffle conduit.

The method may comprise providing a cross-sectional area of an aperture proximate to the effluent stream conduit to be smaller than a cross-sectional area of an aperture distal from the effluent stream conduit.

The method may comprise matching a cross-sectional area of the plurality of apertures to a cross-sectional area of the baffle conduit.

The method may comprise redirecting flow of the effluent stream in the plenum to a direction transverse to the major direction of flow.

The method may comprise redirecting flow of the effluent stream to convey the effluent stream radially into the baffle conduit.

The method may comprise redirecting flow of the effluent stream to convey the effluent stream in an axial direction along the baffle conduit into the inlet nozzle.

The method may comprise delivering the effluent stream along the major direction of flow which is transverse to the axial direction.

The effluent stream conduit may follow a curved path.

The method may comprise imparting a circumferential rotational component to the effluent stream.

The method may comprise positioning a coaxial lance within at least one of the baffle conduit and the inlet nozzle.

The method may comprise extending the helical structure along the axial direction beyond the lance.

The method may comprise failing to extend the lance fails along the axial direction beyond an opening of the inlet nozzle locatable within the abatement chamber.

The method may comprise extending the baffle conduit along the axial direction for a distance which is at least 5 times its internal diameter.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAIL DESCRIPTION

Before discussing the embodiments in any more detail, first an overview will be provided. Embodiments provide an arrangement which helps to facilitate mixing between a gas (for example, a fuel, an oxidant or another compound) and an effluent stream and increases the residence time of the mixed gas and effluent stream prior to entering an abatement chamber which increases DRE and can decrease fuel consumption. This is achieved by inhibiting the effluent stream from following a flow path which limits the amount of mixing that occurs and reduces residence time and instead causes the effluent stream to follow a flow path which facilitates such mixing and increases residence time. In particular, a structure is positioned into the effluent stream flow to prevent the effluent stream following a direct, line-of-sight path from the effluent stream conduit into the inlet nozzle which reduces mixing and residence time since a reduction in mixing and residence time causes a reduction in destruction rate efficiency (DRE). The effluent stream is sometimes delivered obliquely to the inlet nozzle which causes non-uniform flow of the effluent stream within the inlet nozzle, with greater flow and less mixing occurring in that portion of the nozzle proximate to the inlet providing the effluent stream. This results in non-uniform mixing of the effluent stream and the gas, which results in a less than optimal DRE. Although different structures are possible, in an arrangement which uses an inlet nozzle to deliver the mixed effluent stream and gas to an abatement chamber, a baffle can be positioned to intersect the flow of the effluent stream when being delivered to the inlet nozzle. The baffle may have one or more apertures therein. The effluent stream therefore has its direction of flow diverted by the baffle. The effluent stream then flows through these apertures and into the inlet nozzle. The baffle can then re-establish a uniform flow of the effluent stream within the nozzle for mixing with the fuel.

Inlet Assembly

Figure 1:
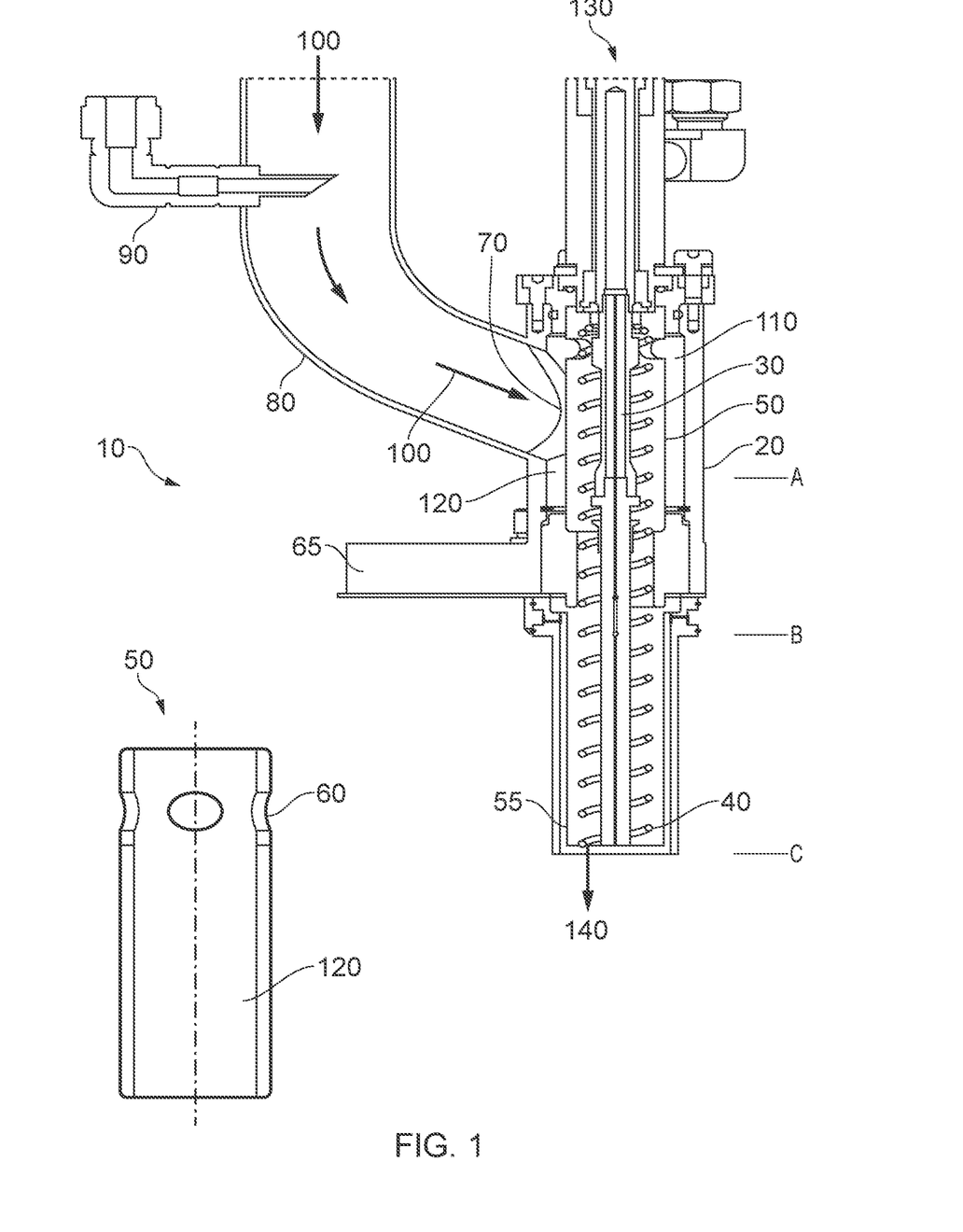
FIG. 1 illustrates an inlet assembly for an abatement apparatus according to one embodiment.

FIG. 1 illustrates an inlet assembly 10 for an abatement apparatus according to one embodiment. The inlet assembly 10 has an inlet nozzle 20 comprising an elongate cylindrical conduit having a coaxially located fuel lance 30 therewithin. A concentrically located helical spring 40 is positioned between an outer surface of the fuel lance 30 and an inner surface of the inlet nozzle 20. The fuel lance 30 can be provisioned in this example with three different lengths, A, B or C. A further concentrically located lance 55 is provided which delivers a gas (such as fuel or oxidant) provided to a port 65. In an upper portion of the inlet nozzle 20 there is provided a baffle 50. The baffle 50 comprises a cylindrical tube having a number of apertures 60 formed through its wall. The wall of the inlet nozzle 20 has an aperture 70 which receives an effluent stream conduit 80. The effluent stream conduit is provided with an oxygen inject 90 which is arranged to inject oxygen into the effluent stream conduit 80.

In operation, an effluent stream 100 is conveyed into the effluent stream conduit 80. When activated, the oxygen inject 90 conveys oxygen into the effluent stream 100 as it passes through the effluent stream conduit 80 towards the aperture 70. The baffle 50 presents a cylindrical surface to the incident effluent stream 100 being conveyed through the aperture 70. The baffle 50 seals the upper portion of the inlet nozzle 20 and the only way for the effluent stream 100 to progress through the inlet nozzle 20 is via the apertures 60. Accordingly, the effluent stream 100 passes through the aperture 70 and into a plenum 110 defined by an outer surface of the baffle 50 and an inner surface of the upper portion of the inlet nozzle 20. The main directional flow of the effluent stream is thus diverted towards the apertures 60. This redirection of flow causes turbulence which assists in mixing the oxygen into the effluent stream 100. An annular chamber 120 is defined between the inner surface of the baffle 50 and an outer surface of the fuel lance 30. The annular chamber 120 redirects the flow of the effluent stream 100 along the elongate axis of the annular chamber 120. These redirections of flow cause turbulence which assists in mixing the oxygen into the effluent stream 100. As the effluent stream 100 travels along the elongate axis of the annular chamber 120, a generally laminar flow is restored. As the effluent stream 100 passes the end of the fuel lance 30, mixing between fuel 130 delivered via the fuel lance 30 and the effluent stream 100 commences. Mixing continues until the mixed fuel and effluent stream 140 exits the inlet nozzle 20 into the abatement chamber (not shown) surrounded concentrically by the gas delivered from the lance 55. To facilitate mixing and improve the stability of the mixed fuel and effluent stream 140, the spring 40 imparts a rotational component to the mixed fuel and effluent stream 140 as it passes along the annular chamber 120.

As can be understood from FIG. 1, were the baffle 50 not present then the effluent stream 100 delivered through the aperture 70 would enter the inlet nozzle 20 at an oblique angle and travel past the end of the fuel lance 30 when in position A in a non-uniform way, which would lead to non-uniform mixing and suboptimal DRE. In contrast, with the baffle 50 present, the effluent stream 100 travels uniformly along the annular chamber 120 which allows for uniform distribution of the fuel (typically by diffusion) into the annular column of effluent stream 100 passing through the annular chamber 120. The presence of a uniform distribution of fuel helps to improve the DRE. As mentioned above, the arrangement of the effluent stream conduit, the aperture 70 and the baffle 50 gives improved DRE by primarily removing the line-of-sight gas flow into the inlet nozzle 20. The arrangement forces the main gas flow to distribute evenly around the lance fuel, resulting in stable, consistent and repeatable DRE and NOx readings.

Velocities

Figure 2:
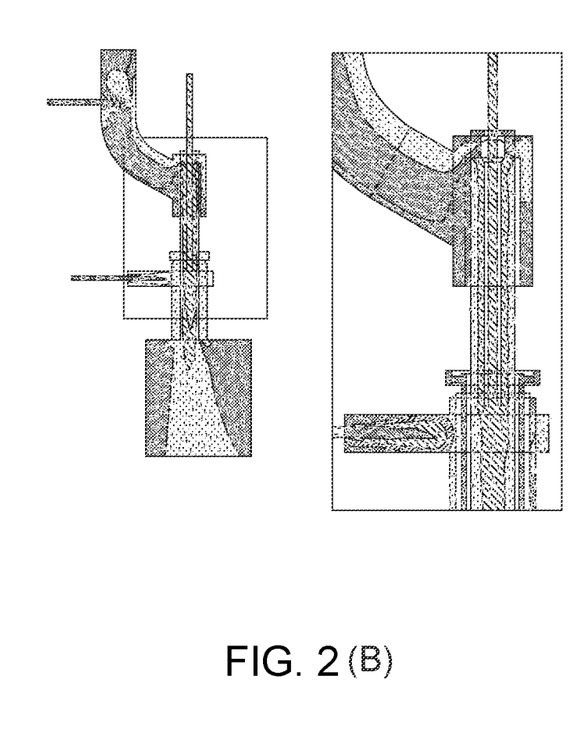
FIG. 2a is a computational fluid dynamics analysis showing the velocities experienced within the inlet assembly without the baffle.
FIG. 2b is a computational fluid dynamics analysis showing the velocities experienced within the inlet assembly with the baffle.

FIG. 2 is a computational fluid dynamics analysis showing the velocities experienced within the inlet assembly 10. FIG. 2A shows the arrangement without the baffle 50 and FIG. 2B shows the arrangement with the baffle 50.

As can be seen, in the arrangement in FIG. 2A, the velocity of the effluent stream as it enters the inlet nozzle 20 is relatively low and the flow is biased towards the lower portion of the aperture 70 proximate the fuel lance 30. However, as can be seen in FIG. 2B, pre-reaction mixing is improved because the baffle 50 helps to provide a uniform distribution of the effluent stream 100 within the inlet nozzle 20, a smooth flow of the effluent stream through the inlet nozzle 20 and aids mixing between the fuel and the effluent stream together with a longer residence time for the mixed fuel and effluent stream 140 before entering the abatement chamber. The presence of the baffle 50 gives the effluent stream 100 a higher velocity, the baffle 50 forces the effluent stream 100 up into a smaller surface area and therefore increases its velocity, which may assist in mixing of the fuel 130 and the effluent stream 100.

Mixing

Figure 3A:
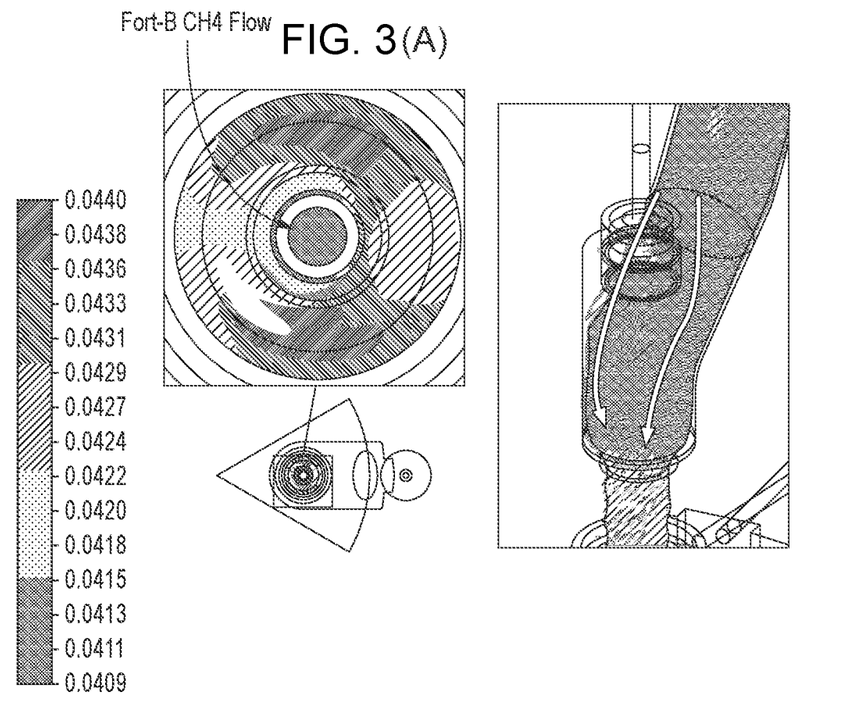
FIG. 3a illustrates the contours of the fuel mass fraction on a plane which is located downstream of the fuel lance without the baffle.
Figure 3B:
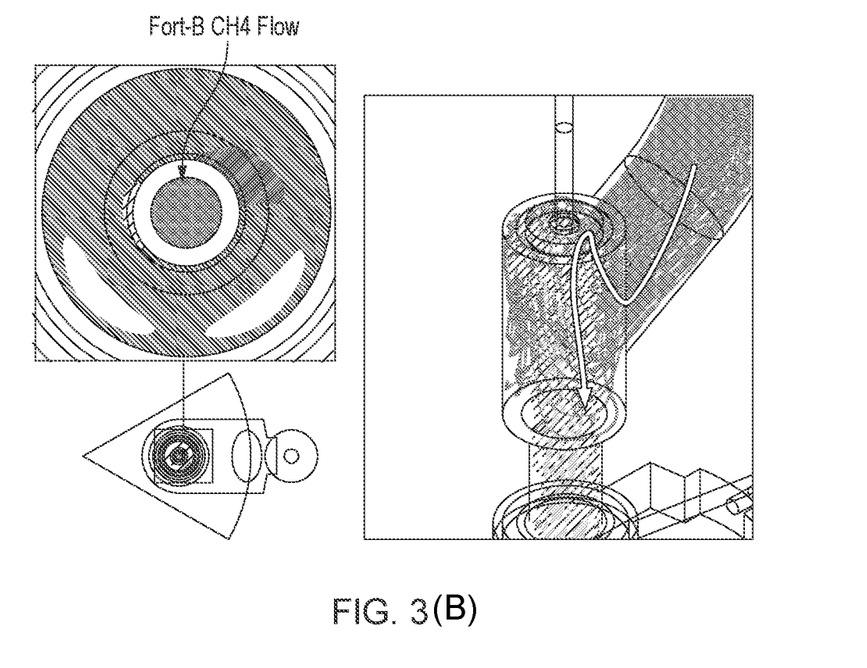
FIG. 3b illustrates the contours of the fuel mass fraction on a plane which is located downstream of the fuel lance with the baffle.

FIG. 3 illustrates the contours of the fuel mass fraction on a plane which is located downstream of the fuel lance when at position A. FIG. 3A shows the mass fractions with no baffle 50 present, while FIG. 3B shows the mass fraction with the baffle 50 present. As can be seen, the fuel mixing is significantly improved in the arrangement where the baffle 50 is present. In particular, in FIG. 3A, due to the inclined entry of flow from the effluent stream conduit 80 into the inlet nozzle 20, the maximum flow of fuel is concentrated at a region under the circled area and hence the mass fraction is higher at this location. In FIG. 3B, the flow is travelling straight in a downward direction and hence the flow is distributed across the plane and the mass fraction is more uniform.

Figure 4:
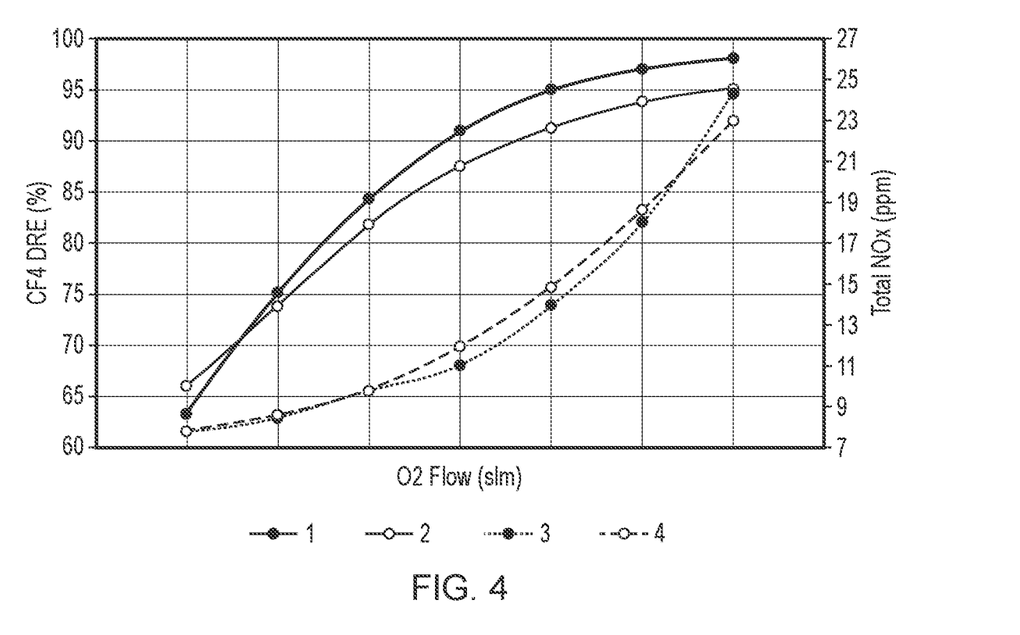
FIG. 4 is a graph demonstrating the difference in DRE and NOx with and without the baffle.

FIG. 4 is a graph demonstrating the difference in DRE and NOx with (line 1 which shows DRE and line 3 which shows NOx) and without (line 2 which shows DRE and line 4 which shows NOx) the baffle 50 with increasing flow of oxygen. As can be seen, the performance with the baffle 50 when achieving 95% DRE generates 15 ppm NOx compared to the performance without a battle where 23 ppm NOx is generated at 95% DRE.

Figure 5:
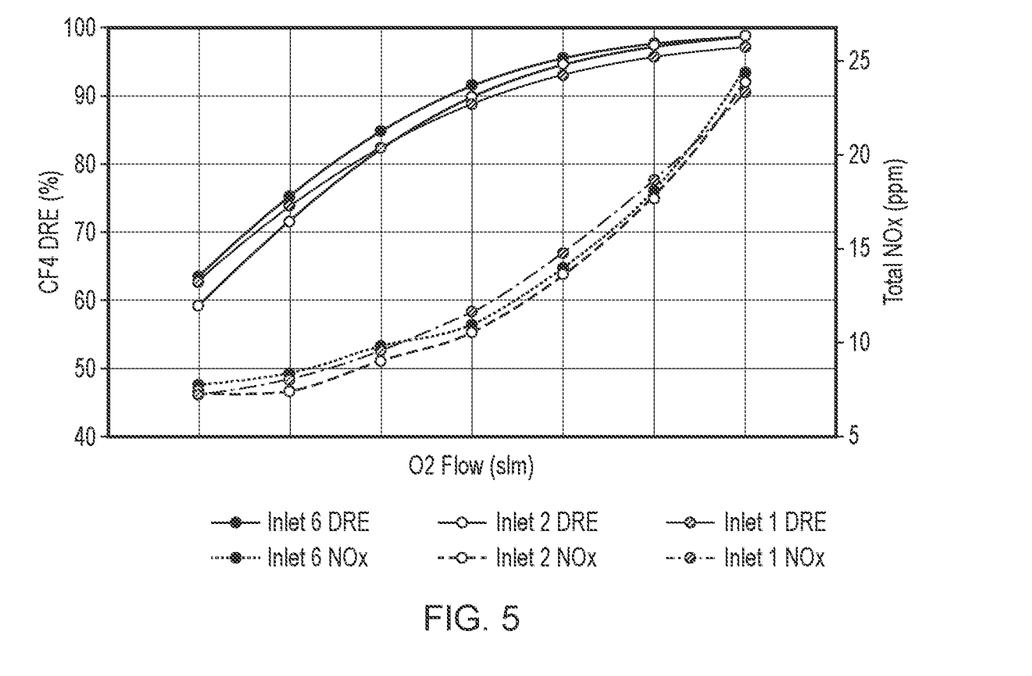
FIG. 5 demonstrates the performance of an abatement apparatus with one, two and six inlet assemblies feeding the abatement chamber.

FIG. 5 demonstrates the performance of an abatement apparatus with one, two and six inlet assemblies 10 feeding the abatement chamber with increasing flow of oxygen. As can be seen, they each achieve consistent performance.

Figure 6:
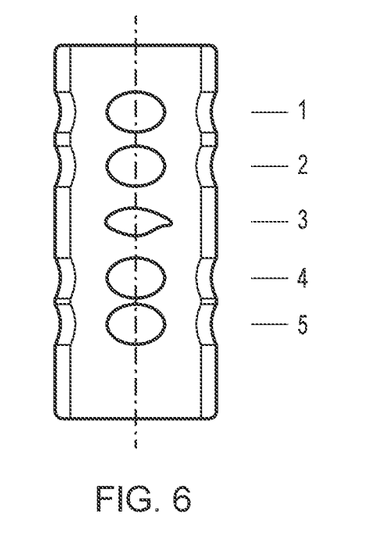
FIG. 6 shows the baffle with orifices located at different positions.

FIG. 6 shows the baffle 50 with orifices located at different positions designated positions 1, 2, 3, 4 and 5.

Figure 7:
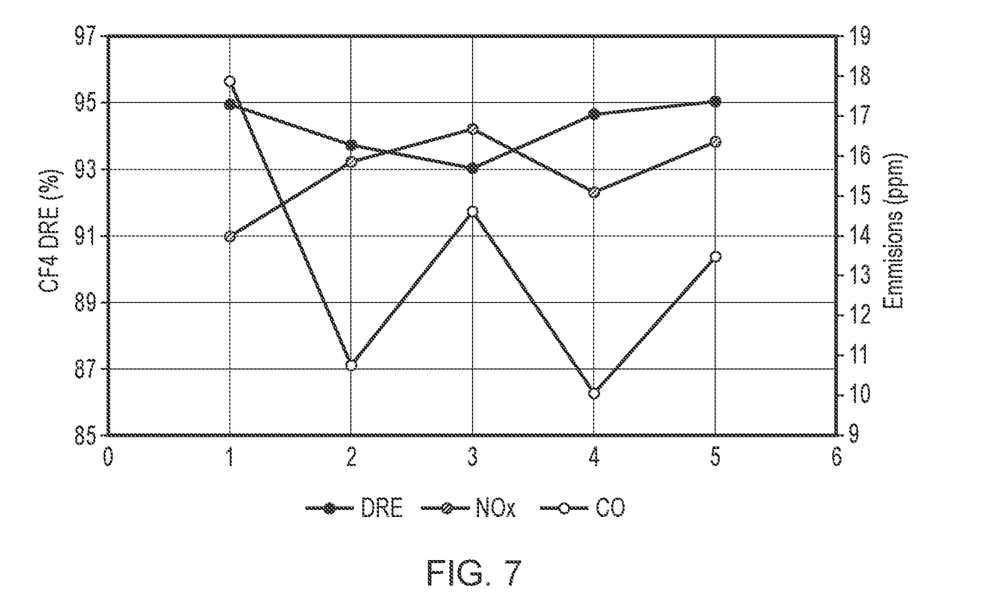
FIG. 7 is a graph demonstrating the DRE, NOx and CO produced as the orifice apertures move down the baffle.

As can be seen in FIG. 7, which is a graph demonstrating the DRE, NOx and CO produced as the orifice apertures 70 move down the baffle 50 (at positions 1, 2, 3, 4 and 5 shown in FIG. 6), CF4 DRE reduces—this is a consequence of the effluent stream 100 entering the line-of-sight area of the inlet nozzle 20 from the effluent stream conduit 80. As the apertures 70 continue down, the effluent stream 100 leaves this area and the CF4 DRE returns to its normal performance. As result, it is important that the baffle 50 removes the line-of-sight gas flow from the effluent stream conduit 80 into the inlet nozzle 20, other variations where the baffle 50 either forces the effluent stream 100 to sweep around the baffle 50 into the plenum 110 and up or down into the annular chamber 120 significantly improves abatement performance.

Figure 8A:
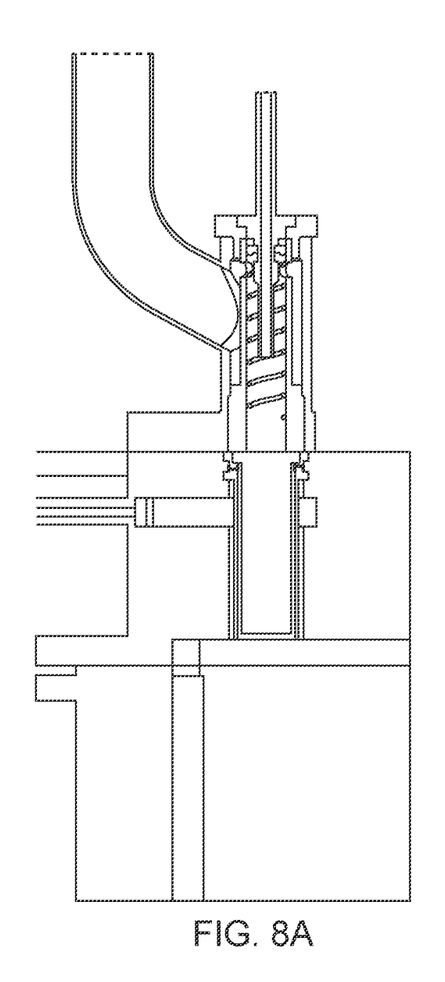
FIG. 8a shows the position of the standard length fuel lance.
Figure 8B:
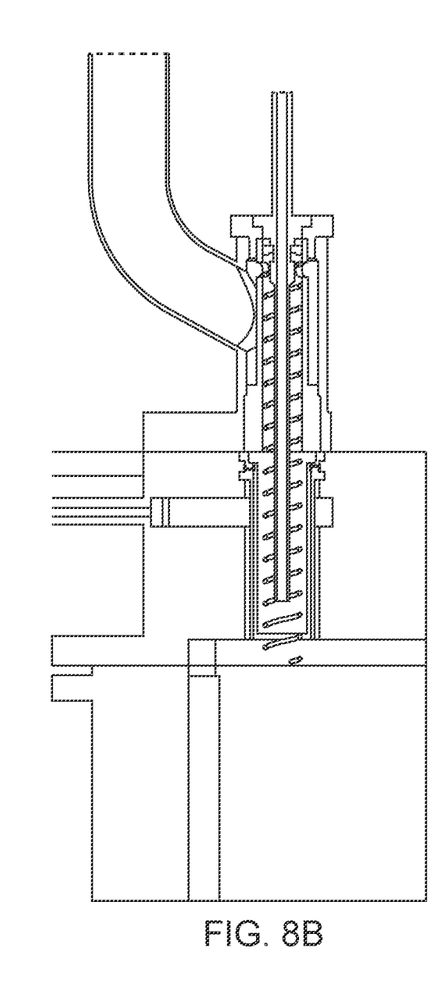
FIG. 8b shows the position of the longest length fuel lance.

FIGS. 8A and 8B show the positions of a standard length fuel lance 30 (FIG. 8A) and the longest length fuel lance 30 (FIG. 8B) with appropriately sized springs 40, as mentioned in FIG. 1 above.

Figure 9:
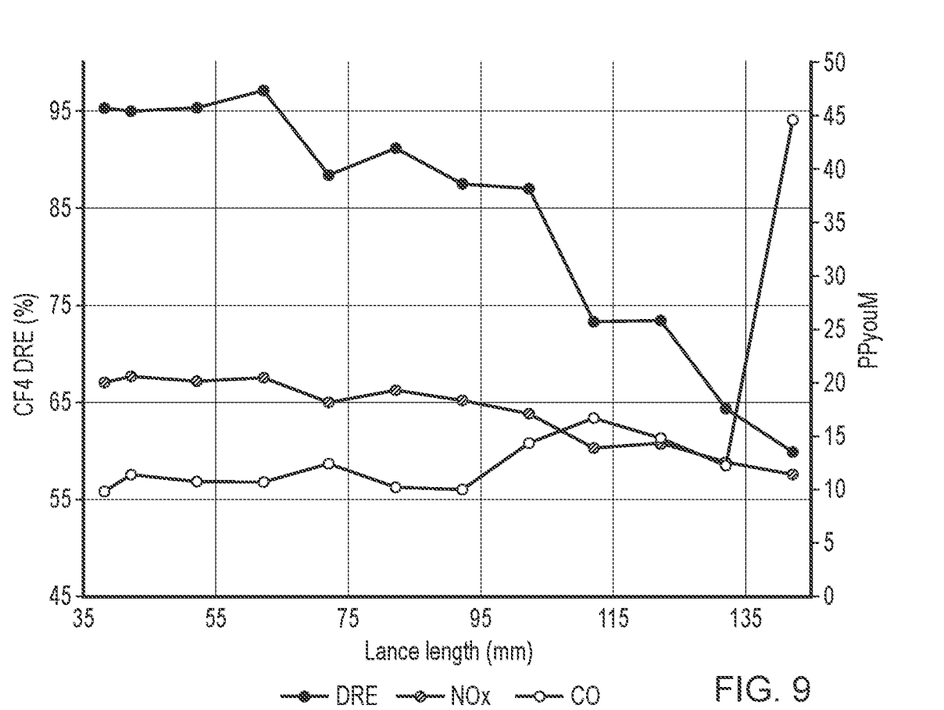
FIG. 9 is a graph showing the DRE, CO and NOx performance with varied fuel lance lengths.

FIG. 9 is a graph showing the DRE, CO and NOx performance with varied fuel lance 30 lengths when operating with 9 SLM lance fuel, 2.5 SLM coaxial fuel, 15 SLM 02 and 26 LPM CDA. As can be seen in FIG. 9, there is a clear trend that as the length of the fuel lance 30 increases, the DRE increases and therefore it is preferred to incorporate a short fuel lance 30. The short fuel lance 30 gives an increased residence time of fuel and mixed fuel and effluent stream 140 within the annular chamber 120 and the distance of the lance fuel from the coaxial flame is important for CF4 DRE. Also, the analysis shown in FIG. 2 suggest that the lance fuel velocity is extremely disruptive, the shortest fuel lance 30 allows the lance fuel to interact with the mixed fuel and effluent stream 140 with the added benefit of residence time for the flows to smooth out, creating a more laminar flow into the coaxial flame.

Figure 10:
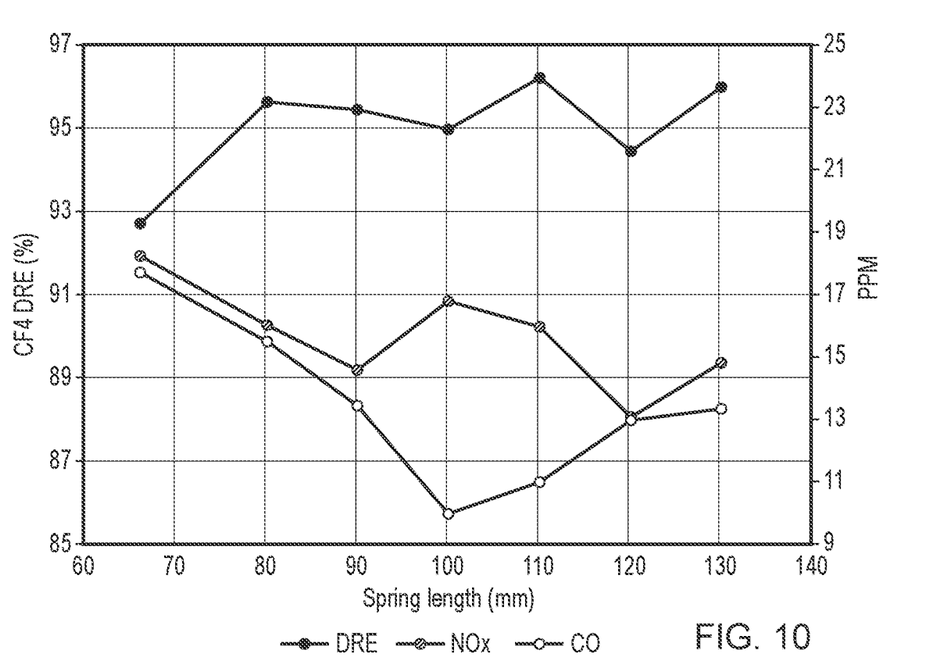
FIG. 10 is a graph showing the DRE, CO and NOx performance with varied spring lengths.

FIG. 10 is a graph showing the DRE, CO and NOx performance with varied spring 40 lengths (with the shortest fuel lance 30 installed), with 9 SLM of lance fuel, 2.5 SLM of coaxial fuel, 15 SLM of 02 and 26 LPM of CDA. From the data shown, it seems that as the length of the spring 40 increases, more turbulent gas flows interact with the swirling effect within the annular chamber 120, as shown in FIG. 11, resulting in an increased mixing with oxygen from the available CDA and consequently reducing NOx and CO emissions.

Figure 11A:
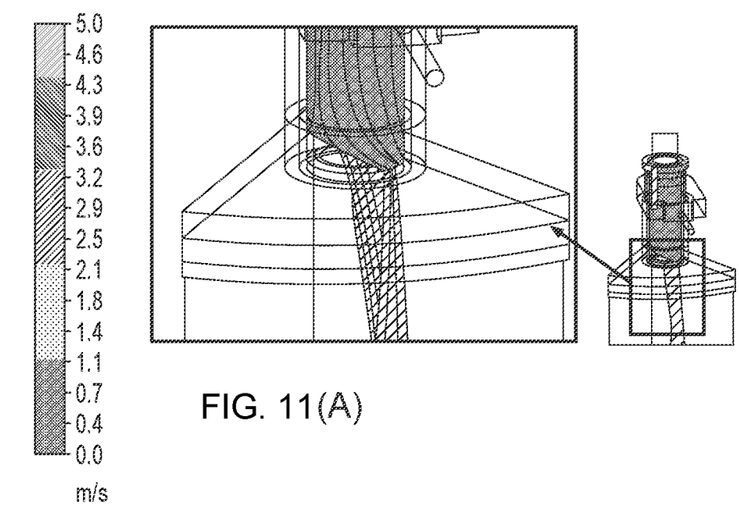
FIG. 11a is a CFD of the inlet assembly with the baffle.
Figure 11B:
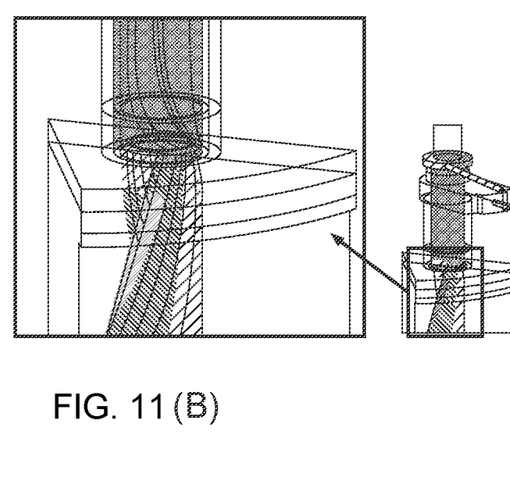
FIG. 11b is a CFD of the inlet assembly without the baffle.

FIG. 11 (which is a CFD comparison of the inlet assembly 10 with (FIG. 11B) and without (FIG. 11A) the baffle 50 also shows due to the increased inertia produced by the baffle 50, the mixed fuel and effluent stream 140 have an increased swirl as they exit the inlet nozzle 20.

Accordingly, it can be seen that the swept effluent stream conduit 80 and baffle 50 controls the gas path of the effluent stream 100 into the abatement chamber.

This arrangement meets the need to improve CF4 DRE and thus the distribution of the effluent stream around the fuel lance 30 to in turn help mix the lance fuel with the incoming process gas (CF4, O2 and typically 50 slm of N2). The swept effluent stream conduit 80 removes the process flow gas bias, aids better mixing of the lance fuel and incoming process gas and allows a longer residence time of the resulting mixture before entering the coaxial flame.

Figure 12:
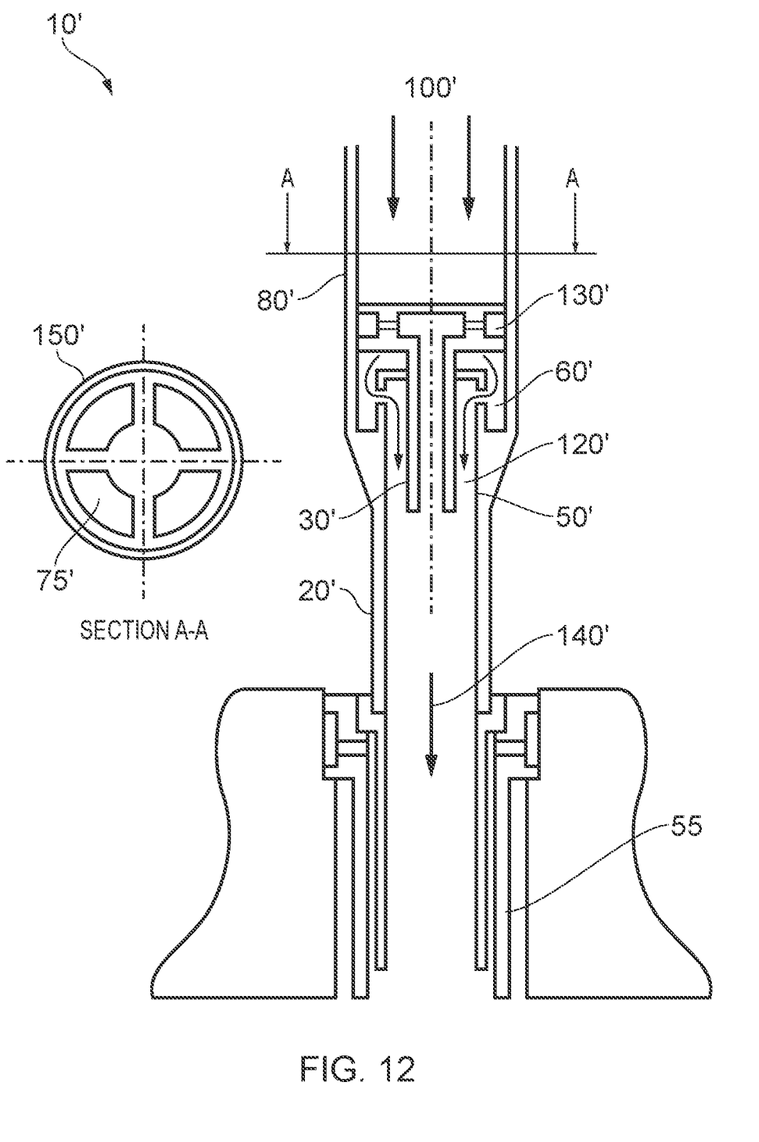
FIG. 12 illustrates an inlet assembly for an abatement apparatus according to one embodiment.

FIG. 12 illustrates an inlet assembly 10' for an abatement apparatus according to one embodiment. This arrangement is similar to that described with reference to FIG. 1 but the effluent stream 100' is delivered axially. The inlet assembly 10' has an inlet nozzle 20' comprising an elongate cylindrical conduit having a coaxially located fuel lance 30' therewithin. A concentrically located helical spring (not shown) may be positioned between an outer surface of the fuel lance 30' and an inner surface of the inlet nozzle 20'. The fuel lance 30' can be provisioned with different lengths as mentioned above. A further concentrically located lance 55' is provided which delivers a gas (such as fuel or oxidant). In an upper portion of the inlet nozzle 20' there is provided a baffle 50'. The baffle 50' comprises a cylindrical tube having a number of apertures 60' formed through its wall. An effluent stream conduit 80' receives an effluent stream 100' and is located upstream of a feed structure 150' which sits in the effluent stream conduit 80'. The feed structure 150' conveys a fuel 130' to the fuel lance 30' and has apertures 75' to allow the effluent stream 100' to be conveyed from the effluent stream conduit 80' to a plenum surrounding the baffle 50'

In operation, the effluent stream 100' is conveyed into the effluent stream conduit 80'. When activated, an oxygen inject (not shown) conveys oxygen into the effluent stream 100' as it passes through the effluent stream conduit 80' towards the feed structure 150'. The effluent stream 100' passes through the apertures 75' and undertakes multiple changes of direction as the only way for the effluent stream 100' to progress through the inlet nozzle 20' is via the apertures 60'. Accordingly, the main directional flow of the effluent stream 100' is thus diverted towards the apertures 60'. This redirection of flow causes turbulence which assists in mixing the oxygen into the effluent stream 100'. An annular chamber 120' is defined between the inner surface of the baffle 50' and an outer surface of the fuel lance 30'. The annular chamber 120' redirects the flow of the effluent stream 100' along the elongate axis of the annular chamber 120'. These redirections of flow cause turbulence which assists in mixing the oxygen into the effluent stream 100'. As the effluent stream 100' travels along the elongate axis of the annular chamber 120', a generally laminar flow is restored. As the effluent stream 100' passes the end of the fuel lance 30', mixing between fuel 130' delivered via the fuel lance 30' and the effluent stream 100' commences. Mixing continues until the mixed fuel and effluent stream 140' exits the inlet nozzle 20' into the abatement chamber (not shown) surrounded concentrically by the gas delivered from the lance 55'. To facilitate mixing and improve the stability of the mixed fuel and effluent stream 140', the spring may impart a rotational component to the mixed fuel and effluent stream 140' as it passes along the annular chamber 120'.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. An inlet assembly for an abatement apparatus, comprising:
   an effluent stream conduit configured to convey an effluent stream along a major direction of flow within said effluent stream conduit;
   an inlet nozzle fluidly coupled with said effluent stream conduit and configured to convey said effluent stream received from said effluent stream conduit to an abatement chamber of said abatement apparatus in an inlet direction; and
   a baffle interposed between said effluent stream conduit and said inlet nozzle, said baffle being shaped and configured to redirect flow of said effluent stream from said effluent stream conduit in a direction opposite the inlet direction and then into said inlet nozzle, wherein said baffle comprises a baffle conduit positioned within a plenum configured to receive said effluent stream from said effluent stream conduit, said baffle conduit defining at least one aperture positioned for fluid communication between said plenum and said inlet nozzle and wherein at least one of said baffle conduit and said inlet nozzle comprises coaxial lance positioned therewithin.

2. The inlet assembly of claim 1, wherein said baffle is shaped and configured to redirect flow of said effluent stream away from said major direction of flow into said inlet nozzle.

3. The inlet assembly of claim 1, wherein said baffle is shaped and configured to encourage turbulent flow of said effluent stream upstream of said inlet nozzle.

4. The inlet assembly of claim 1, wherein said baffle is shaped and configured to encourage laminar flow of said effluent stream into said inlet nozzle.

5. The inlet assembly of claim 1, wherein said baffle is shaped and configured to encourage a uniform axial rate of flow within said inlet nozzle.

6. The inlet assembly of claim 1, wherein said baffle is shaped and configured to inhibit increased axial rate of flow within said inlet nozzle proximate said effluent stream conduit and inhibit decreased axial rate of flow within said inlet nozzle distal said effluent stream conduit to obtain said uniform axial rate of flow within said inlet nozzle.

7. The inlet assembly of claim 1, wherein said at least one aperture is located away from a position on said baffle conduit which is aligned with incident effluent stream travelling along said major direction of flow.

8. The inlet assembly of claim 1, wherein said at least one aperture is located towards at least one axial end of said baffle conduit.

9. The inlet assembly of claim 1, comprising a plurality of said apertures.

10. The inlet assembly of claim 1, wherein a cross-sectional area of an aperture proximate to said effluent stream conduit is smaller than a cross-sectional area of an aperture distal from said effluent stream conduit.

11. The inlet assembly of claim 1, wherein said baffle conduit is shaped to redirect flow of said effluent stream in said plenum to a direction transverse to said major direction of flow.

12. The inlet assembly of claim 1, wherein said apertures are shaped to redirect flow of said effluent stream to convey said effluent stream radially into said baffle conduit.

13. The inlet assembly of claim 1, wherein said baffle conduit is shaped to redirect flow of said effluent stream to convey said effluent stream in an axial direction along said baffle conduit into said inlet nozzle.

14. The inlet assembly of claim 1, wherein said effluent stream conduit is shaped and configured to deliver said effluent stream along said major direction of flow which is transverse to said axial direction.

15. The inlet assembly of claim 1, wherein said effluent stream conduit follows a curved path.

16. The inlet assembly of claim 1, wherein a helical structure is configured to extend along said axial direction beyond said lance.

17. The inlet assembly of claim 1, wherein said baffle conduit extends along said axial direction for at least 5 times its internal diameter.

18. An abatement apparatus comprising an inlet assembly as claimed in claim 1 and said abatement chamber.

19. A method, comprising:
conveying an effluent stream along a major direction of flow within an effluent stream conduit;
coupling an inlet nozzle with said effluent stream conduit to convey said effluent stream received from said effluent stream conduit to an abatement chamber of said abatement apparatus along an inlet direction; and
interposing a baffle between said effluent stream conduit and said inlet nozzle to redirect flow of said effluent stream from said effluent stream conduit along a direction opposite the inlet direction and into said inlet nozzle, wherein said baffle comprises a baffle conduit positioned within a plenum configured to receive said effluent stream from said effluent stream conduit, said baffle conduit defining at least one aperture positioned for fluid communication between said plenum and said inlet nozzle and wherein at least one of said baffle conduit and said inlet nozzle comprises coaxial lance positioned therewithin.

* * * * *